UNITED STATES PATENT OFFICE.

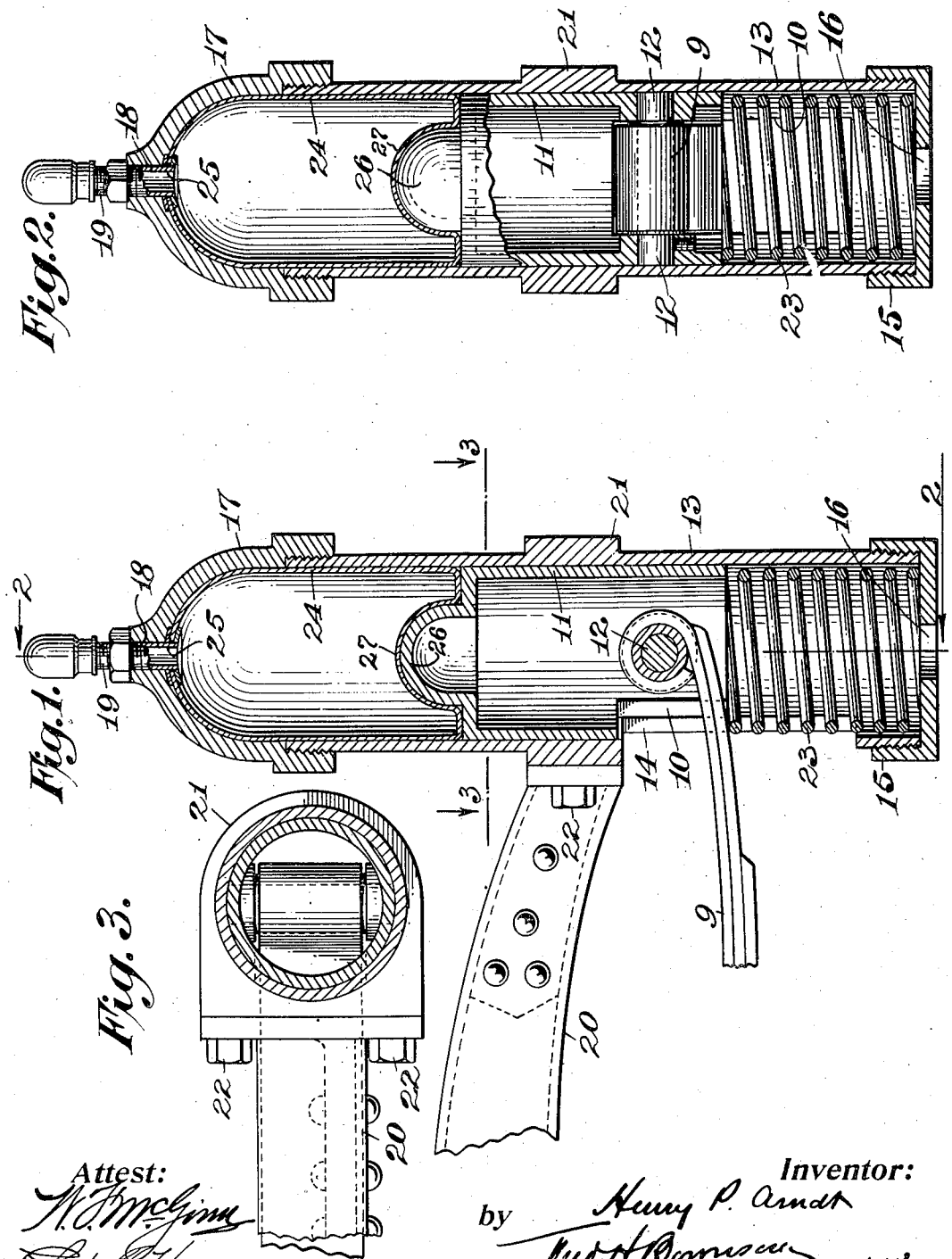

HENRY P. ARNDT, OF AMSTON, CONNECTICUT, ASSIGNOR OF TWO-THIRDS TO CHARLES M. AMS, OF NEW YORK, N. Y.

VEHICLE-SPRING.

1,276,309.  Specification of Letters Patent.  Patented Aug. 20, 1918.

Application filed October 4, 1916. Serial No. 123,753.

*To all whom it may concern:*

Be it known that I, HENRY P. ARNDT, a citizen of the United States, and a resident of Amston, county of Tolland, and State of Connecticut, have invented certain new and useful Improvements in Vehicle - Springs, of which the following is a specification.

This invention relates generally to the running gear of vehicles, especially those of the self-propelled type, with more particular reference to means adapted to be interposed between the body and the running gear of a vehicle for the purpose of minimizing the effects of shocks and jars such as would otherwise be imposed upon the vehicle body when the wheels pass over rough or uneven road surfaces or when the vehicle is abruptly started or stopped.

Heretofore, what may be termed the cushioning effect to which I have just referred has been secured to some extent by the use of cushion or pneumatic tires, in connection with various types of so-called shock absorbers, but, in addition to the manifold objections to these special tires, and to all of the shock absorbers which are generally known at the present time, the results obtained by their use have been far from satisfactory. Among the objections to cushion and pneumatic tires may be mentioned their excessive initial cost, the frequently-recurring expense of repairs and replacements, and the liability of pneumatic tires to "blow-outs" and punctures. Shock absorbers are an added item of cost to the vehicle and provide additional mechanism to be looked after and maintained, while at the same time the greater number of them are more or less complicated and comprise several wearing parts.

In the effort to do away with the use of pneumatic tires, and to partly or wholly eliminate the necessity for shock absorbers, many kinds of special wheels have been devised, especially since self-propelled vehicles came into common use, and in connection with practically all of these the primary object has been to secure a considerable degree of resiliency between a sectional or other form of so-called solid tire and the hub of the wheel. Not only has this character of wheel proven to be expensive, complicated and cumbersome, and the results secured in many ways unsatisfactory, but another very strong objection to the use of such wheels has been their inability to withstand torsional or lateral stresses, such as those imposed by sudden turning of the vehicle, skidding, or side contact of the wheel with a fixed object, such, for example, as a curbstone.

Practical use has demonstrated that by the employment of what I shall for convenience hereinafter term my improved spring mounting, I am not only able to secure the results heretofore attempted to be secured through the employment of special tires, special wheels, special springs, shock-absorbers, and other types and forms of cushions interposed between the running gear and the body of the vehicle, but I overcome the numerous objections to said devices—not only those specifically mentioned herein but others which are now well-known in this art.

The principal object of the present invention is the interposition between what is commonly termed the running gear of a vehicle and the body thereof, of means for opposing to the highest possible degree the transmission of the effects of shocks, jars and jolts from said running gear to said body. Incidental to the above, I have in view the provision of cushioning means which shall be simple, inexpensive in both first cost and maintenance, easily and quickly installed, repaired and replaced, and unlikely to get out of order.

My invention will be more readily understood by reference to the accompanying drawings, forming a part of this specification, in which—

Figure 1 is a central sectional side elevation of a practical and convenient form of my improved spring mounting;

Fig. 2 is a sectional view taken substantially on the line 2—2 of Fig. 1, and

Fig. 3 is a transverse section taken substantially on the line 3—3 of Fig. 1.

Referring now to the drawings in detail, numeral 9 designates a laminated semi-elliptic spring, such as is commonly associated with the front axle of a vehicle, the end of said spring passing through a slotted opening 10 in a cylindrical plunger member 11, the end thereof being pivotally secured within said member by means of a pin 12. The plunger 11 is telescopically mounted within a cylindrical casing 13, which has a slot 14 registering with the slot 10 but somewhat longer than the latter. At its lower end, the casing 13 is provided with a screw-cap 15, having an air-exhaust opening 16 at its center, and at the upper end of said casing is a screw-cap 17, which is preferably dome-shaped and has an opening 18 for a purpose which will be hereinafter explained. The forward end of the usual side member 20 of the body-supporting frame—now more generally directly pivoted to the contiguous end of the spring 9, is secured to the casing 13 preferably by means of bolts 22 22 screwed into an integral reinforcing boss 21 on said casing. Interposed between the cap 15 and the lower end of the plunger 11 is a coil-spring 23, which tends to yieldingly resist relative downward movement of said plunger.

Within the chamber formed by the casing 13 and the dome-shaped cap 17, above the plunger 11, I insert an inflated air-tight sack or bag 24 preferably of soft rubber such as that from which " inner tubes " are made, but which may be of any suitable flexible and impermeable or impervious material, being intended to provide a distortable lining for said chamber to hermetically seal the same, the upper end thereof being equipped at 25 with the usual and well-known valve-stem 19 passing upwardly through the opening 18 in the cap 17 and suitably secured therein. It may be suggested that in order to reduce to a minimum the wear upon the rubber—if rubber is used—due to friction, I prefer to incase the lining sack or bag 24 in a correspondingly shaped covering of fabric, such as canvas, and for the same purpose I may also provide a coating of graphite or similar material on the outside face of either the sack or its covering of fabric, if the latter is employed, or on the inside walls of the cushion-containing chamber.

It will be apparent that if the top face of the plunger 11 were flat, the flexible lining 24 would be distorted more or less unsymmetrically under increased internal air pressure coupled with decreased space for expansion, subjecting certain minor portions of the material—particularly at the corners—to be subject to excessive wear. I therefore provide on the top face of the plunger 11 a protuberance 26 of preferably semi-globular form, which supports a reëntrant or concaved portion 27 of the lining and provides an initial configuration of the lower end thereof which insures what may be termed a " rolling " up the side wall of the casing of the surplus material which accumulates as the dimensions of the containing chamber are diminished. In this manner objectionably sharp angular distortions of the material are avoided.

Furthermore, the elongated contour of the chamber between the telescopically arranged cylinders which is hermetically sealed by the lining 24, facilitates disposition of the surplus material of the lining when the size of the chamber is reduced and the internal air pressure increased. So far as I have been able to determine, this lining creeps up the side wall of the chamber as the cylinder-plunger 11 is forced upwardly in the cylinder 13—or, with precisely similar effect, the cylinder 13 is forced downwardly with respect to the cylinder-plunger 11—the lining 24 also wrinkling to some extent at and near the middle thereof, wherefore the lining itself offers little—in fact, negligible—resistance to the collapse of the telescoping cylinders. Therefore, the action is more nearly exclusively pneumatic. On the other hand, were the dimensions of the lined chamber substantially or more nearly uniform, efforts of the lining to readjust itself to a confined space of reduced dimensions and under the action of materially increased internal air pressure, results in imparting to the lining a high degree of rigidity, thus minimizing the desired purely pneumatic effect. As suggested, I have found that this objectionable tendency to rigidity is to a large extent overcome by elongating the chamber and causing the compressing forces to be applied in a longitudinal direction against one end of the lining, although the same result and substantially the same effect is obtained by transversely disposing the elongated chamber and applying the compressing forces laterally at the middle thereof, as shown and described in a divisional application, filed November 16, 1917, Serial No. 202,274.

From the foregoing, it will be apparent that when an abrupt depression in the road is encountered, the first effect thereof will be the dropping of the wheels into the depression, the body of the vehicle following more slowly on account of inertia augmented by the horizontal movement thereof, and this results in an initial separation of the ends of the parts 20 and 9. However, downward movement of the part 20, under the weight of the body, immediately follows, the shock or jar which would otherwise result being dissipated from the combined effect of the spring 9 and the pneumatic cushion provided by the lined chamber formed between the telescoping cylinders 11 and 13. It is well known, however, that the " rebound " of the body due to the energy stored in the springs by compression or distortion of the latter, is even more disagreeable and objectionable than an initial abrupt downward movement. The spring 23 first receives the impulses of this rebound and takes up the forces thereof in a gradually increasing degree, gently terminating the upward movement of the body.

Similarly, when an obstruction is encountered in the road, the wheels will first receive the upwardly-directed impulses, causing the ends of the parts 20 and 9 to approach each other, the forces which would otherwise cause a jolt or jar to the vehicle body being taken up by the pneumatic cushion provided by the lined chamber between the telescoping cylinders, which makes more gradual and gently terminates consequent upward movement of the vehicle body, the "rebound" being minimized and taken up by the spring 23.

In fact, as set forth in my divisional application aforesaid, a peculiar relationship would seem to exist between the pneumatic cushion, the spring 9 and the spring 23, which experience has demonstrated to my entire satisfaction coöperate to insure a degree of "easy-riding" qualities not attainable through the use of pneumatic tires and shock-absorbers alone.

Many modifications of minor details of my improved vehicle spring will doubtless readily suggest themselves to those skilled in the art to which it appertains, and I therefore do not desire to limit my invention to the specific constructions herein shown and described.

I claim as new and desire to secure by Letters Patent:

1. In combination, with each of the side members of the body-supporting frame of a motor vehicle, and a semi-elliptic spring having one end connected with said member intermediate the ends of the latter, of a device comprising two telescoping members, mounted at the other end of said spring and at the end of said frame member, respectively, and combining to provide a chamber therebetween, a flexible, impervious and inflated sack or bag in said chamber substantially forming an hermetic lining therefor to provide an air-tight cushion, and a spring associated with one of said telescoping members to yieldingly oppose the reactive forces of said cushion when compressed.

2. In combination, with each of the side members of the body-supporting frame of a motor vehicle, and a semi-elliptic spring having one end connected with said member intermediate the ends of the latter, of a device comprising two telescoping cylinders in vertical arrangement both having closed upper ends and combining to provide a chamber therebetween, the outer cylinder being mounted at the end of said frame member and the inner cylinder being mounted at the other end of said spring, a flexible, impervious and inflated sack or bag in said chamber substantially forming an hermetic lining therefor to provide an air-tight cushion, and a spring associated with one of said cylinders to yieldingly oppose the reactive forces of said cushion when compressed.

In testimony of the foregoing, I have hereunto set my hand in the presence of two witnesses.

HENRY P. ARNDT.

Witnesses:
CHESTER F. HAYDEN,
RUTH S. SANFORD.